(12) United States Patent
Harada et al.

(10) Patent No.: US 7,705,509 B2
(45) Date of Patent: Apr. 27, 2010

(54) DYNAMOELECTRIC STATOR CORE AND METHOD FOR MANUFACTURE THEREOF

(75) Inventors: Yoshihiro Harada, Tokyo (JP); Toshiaki Kashihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/486,178

(22) Filed: Jul. 14, 2006

(65) Prior Publication Data

US 2007/0194652 A1  Aug. 23, 2007

(30) Foreign Application Priority Data

Feb. 17, 2006  (JP) .............................. 2006-040508

(51) Int. Cl.
  *H02K 1/00*  (2006.01)
(52) U.S. Cl. ..................... 310/216.007; 310/216.008; 310/216.009
(58) Field of Classification Search ................. 310/216
  See application file for complete search history.

(56) References Cited

U.S. PATENT DOCUMENTS 6,870,292 B2 *  3/2005  Owada et al. ............... 310/194
6,979,930 B2 * 12/2005  Harada et al. .............. 310/216

FOREIGN PATENT DOCUMENTS

| JP | 58-159640 A  | 9/1983  |
|----|--------------|---------|
| JP | 05-168178    | 7/1993  |
| JP | 09-103052 A  | 4/1997  |
| JP | 09-117111 A  | 5/1997  |
| JP | 2000-116037 A| 4/2000  |
| JP | 2000-201462 A| 7/2000  |
| JP | 2001-245446 A| 9/2001  |
| JP | 2001-298885 A| 10/2001 |
| JP | 2001298885 A | * 10/2001 |
| JP | 2002-291184 A| 10/2002 |
| JP | 2003-061319 A| 2/2003  |
| JP | 2003037951 A | * 2/2003 |
| JP | 2003-037951 A| 7/2003  |
| JP | 2004-274970 A| 9/2004  |
| JP | 2005-539478 A| 12/2005 |

OTHER PUBLICATIONS

Japanese Office Action dated Jan. 19, 2010.

* cited by examiner

*Primary Examiner*—Quyen Leung
*Assistant Examiner*—Naishadh N Desai
(74) *Attorney, Agent, or Firm*—Sughrue Mion, PLLC

(57) ABSTRACT

A core assembly is manufactured by punching core segments at a predetermined pitch in a short-side direction thereof with long sides aligned in a width direction of a rolled steel plate, the long sides of the core segments having lengths that are half a length of a long side of the core assembly; preparing four (two first and two second) laminated core sections by aligning punching directions of the core segments and laminating the core segments to a thickness that is half a laminated thickness of the core assembly; preparing two core subassemblies by inverting the second laminated core sections and laminating them onto the first laminated core sections such that the punching directions of the core segments are in opposite directions; and preparing the core assembly by arranging the two core subassemblies in a longitudinal direction and integrating them by joining.

1 Claim, 6 Drawing Sheets

DYNAMOELECTRIC STATOR CORE AND METHOD FOR MANUFACTURE THEREOF

BACKGROUND OF THE INVENTION

1. Field of the Invention

The present invention relates to a dynamoelectric stator core such as for an automotive alternator, etc., and to a method for the manufacture thereof, and particularly relates to a stator core that is prepared by forming slots in core segments having a predetermined length, laminating a large number of the core segments to form a rectangular parallelepiped lamination, and bending the lamination into a cylindrical shape, and to a method for the manufacture thereof.

2. Description of the Related Art

Conventional dynamoelectric stator cores have been prepared by punching strip-shaped magnetic steel plates having a predetermined length so as to have a core root portion and a plurality of tooth portions, preparing a rectangular parallelepiped laminated core by laminating a predetermined number of those plates, then bending the laminated core into a cylindrical shape by winding it onto a cylindrical mandrel member, and finally integrating the laminated core that has been bent into a cylindrical shape by abutting and welding two end surfaces thereof (see Patent Literature 1, for example). This conventional technique has problems such as the abutted surfaces not aligning when the laminated core is bent into a cylindrical shape since the amount of bending at two end portions of the laminated core is less than in other portions, and this has been relieved by bending only the two end portions of the laminated core so as to have a predetermined curvature, and then bending the laminated core as a whole into a cylindrical shape.

Other conventional dynamoelectric stator cores have been prepared by preparing two rectangular parallelepiped laminated core sections by obtaining magnetic steel plates by punching and laminating the plates to a thickness that is half a predetermined thickness, preparing a rectangular parallelepiped laminated core that has the predetermined thickness by laminating the two laminated core sections such that punching directions of the magnetic steel plates are oriented toward each other, and bending that laminated core into a cylindrical shape (see Patent Literature 2, for example). In this conventional technique, the occurrence of damage to an insulating coating of a stator winding due to burrs that are generated during punching has been relieved by laminating the two laminated core sections such that the punching directions of the magnetic steel plate are oriented toward each other.

Since flexing of rollers is unavoidable in the process of rolling rolled steel plates, there are often plate thickness deviations in the width direction of rolled steel plates. If large numbers of annular circular core plates obtained by punching rolled steel plates in which these plate thickness deviations are present are laminated, the thickness of the resulting cylindrical stator core in the direction of lamination has biases relative to a circumferential direction, and biases of magnetic properties in the circumferential direction adversely affect the characteristics of the dynamoelectric machine.

In view of these conditions, laminated thickness has been made uniform relative to a circumferential direction of a stator core by changing the angle of circular core plates that were punched from rolled steel plates as each plate was laminated (see Patent Literature 3, for example). Laminated thickness has also been made uniform relative to a circumferential direction of a stator core by preparing a plurality of circular core plate groups by laminating a predetermined number of circular core plates that were punched from rolled steel plates, and then changing the angle of and laminating a plurality of the circular core plate groups (see Patent Literature 4, for example). Laminated thickness has also been made uniform relative to a circumferential direction of the stator core by preparing two half cores by laminating circular core plates that were punched from rolled steel plates to a thickness that was half a predetermined thickness, and then inverting one half core and laminating it onto the other half core (see Patent Literature 5, for example).

[Patent Literature 1]
  Japanese Patent Laid-Open No. 2001-298885 (Gazette)

[Patent Literature 2]
  Japanese Patent Laid-Open No. 2003-37951 (Gazette)

[Patent Literature 3]
  Japanese Patent Laid-Open No. HEI 05-168178 (Gazette)

[Patent Literature 4]
  Japanese Patent Laid-Open No. HEI 09-117111 (Gazette)

[Patent Literature 5]
  Japanese Patent Laid-Open No. SHO 58-159640 (Gazette)

In the techniques described in Patent Literature 1 and 2, no consideration at all has been given to problems due to plate thickness deviations in the rolled steel plates. Thus, in techniques in which a stator core is prepared by bending a rectangular parallelepiped laminated core into a cylindrical shape, as described in Patent Literature 1 and 2, because two ends of the strip-shaped magnetic steel plates, i.e., remotest portions of the magnetic steel plates are abutted to each other, plate thickness deviations in the width direction of the rolled steel plates are superposed and give rise to laminated thickness differences that cannot be ignored. Large differences in level thereby arise at the abutted portion of the stator core. In dynamoelectric machines that have stator cores of this kind installed, exchanges of magnetic flux between the teeth of the stator core and the magnetic poles of the rotor core are disturbed by the teeth that have differences in level, thereby reducing magnetic circuit characteristics and also giving rise to electromagnetic noise that results from distortion of the magnetic flux, thereby reducing quality.

The techniques described in Patent Literature 3 through 5 prepare stator cores by laminating circular core plates that are punched from rolled steel plates and are difficult to apply to techniques in which a stator core is prepared by bending a rectangular parallelepiped laminated core into a cylindrical shape for the reasons described below.

First, in the stator cores described in Patent Literature 1 and 2, plate thickness deviations in the rolled steel plates give rise to differences in level at the abutted portion of the laminated core that has been bent into a cylindrical shape. In the stator cores described in Patent Literature 3 through 5, on the other hand, plate thickness deviations in the rolled steel plates give rise to biases in plate thickness in a circumferential direction. Thus, since the methods for manufacturing a stator core differ, the problems arising as a result of plate thickness deviations in the rolled steel plates are also completely different.

Second, because longitudinal direction of the magnetic steel plates is limited to being in a width direction of the rolled steel plates or a feed direction of the rolled steel plates if consideration is given to yield when long magnetic steel plates are punched from rolled steel plates, the degree of freedom is extremely small compared to when circular core plates are punched. Consequently, it is not very realistic to change the longitudinal direction (position) of the magnetic steel plates while punching magnetic steel plates from rolled steel plates to allow for plate thickness deviations in the rolled steel plates. In addition, approximately three times as much workspace is required if two laminations of long magnetic steel plates are inverted and laminated than if half cores that are made by laminating circular core plates are inverted, and increases in man-hours and cost cannot be prevented, making such techniques unrealistic.

SUMMARY OF THE INVENTION

The present invention aims to solve the above problems and an object of the present invention is to provide a dynamoelectric stator core that enables magnetic circuit characteristics and quality to be improved by suppressing the occurrence of laminated thickness differences (differences in level) at abutted portions that results from plate thickness deviations in rolled steel plates.

Another object of the present invention is to provide a method for manufacturing a dynamoelectric stator core that enables a dynamoelectric stator core that can suppress deterioration in magnetic circuit characteristics and quality that results from plate thickness deviations in rolled steel plates to be manufactured inexpensively and easily.

In order to achieve the above object, according to one aspect of the present invention, there is provided a method for manufacturing a dynamoelectric stator core that is characterized by including steps of: punching core segments at a predetermined pitch in a short-side direction thereof with long sides aligned in a width direction of a rolled steel plate, the long sides of the core segments having lengths that divide a length of a long side of a core assembly into m sections (where m is an integer that is greater than or equal to 2); preparing 2n laminated core sections (where n is an integer that is greater than or equal to 1) for each of the m sections by aligning punching directions of the core segments and laminating the core segments to a thickness that divides a laminated thickness of the core assembly into 2n equal sections; preparing n sets of core subassemblies for each of the m sections by inverting a first of the laminated core sections and laminating the first laminated core section onto a second of the laminated core sections such that the punching directions of the core segments are in opposite directions; and preparing the core assembly by laminating the n sets of core subassemblies in each of the m sections, and arranging the m sections in a longitudinal direction and integrating the m sections by joining.

According to the present invention, the core segments constituting the laminated core sections are punched with their long-side directions aligned in the width direction of the rolled steel plate. The core subassemblies are prepared by inverting the first laminated core sections and laminating them onto the second laminated core sections such that the punching directions of the core segments are in opposite directions. Thus, plate thickness deviations in the rolled steel plate are canceled, making laminated thicknesses at two longitudinal ends of the core subassemblies equal, and suppressing the occurrence of laminated thickness differences (differences in level) at abutted portions. Magnetic circuit characteristics and quality of the stator core can thereby be improved.

DETAILED DESCRIPTION OF THE PREFERRED EMBODIMENTS

Preferred embodiments of the present invention will now be explained with reference to the drawings.

Embodiment 1

Figure 1:
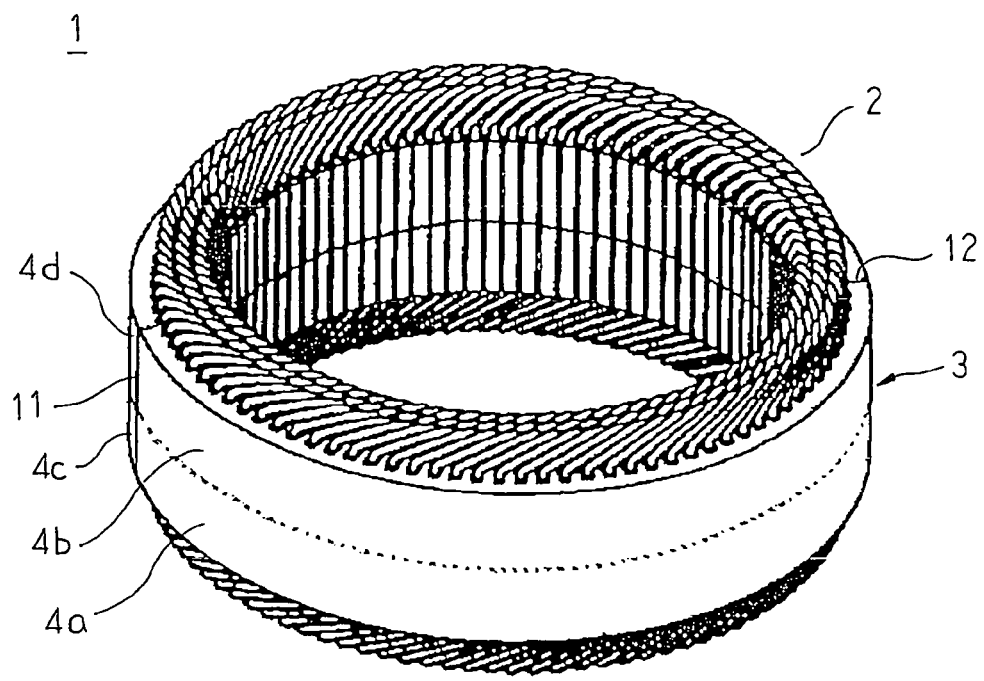
FIG. 1 is a perspective of a dynamoelectric stator that was prepared using a stator core according to Embodiment 1 of the present invention.
Figure 2:
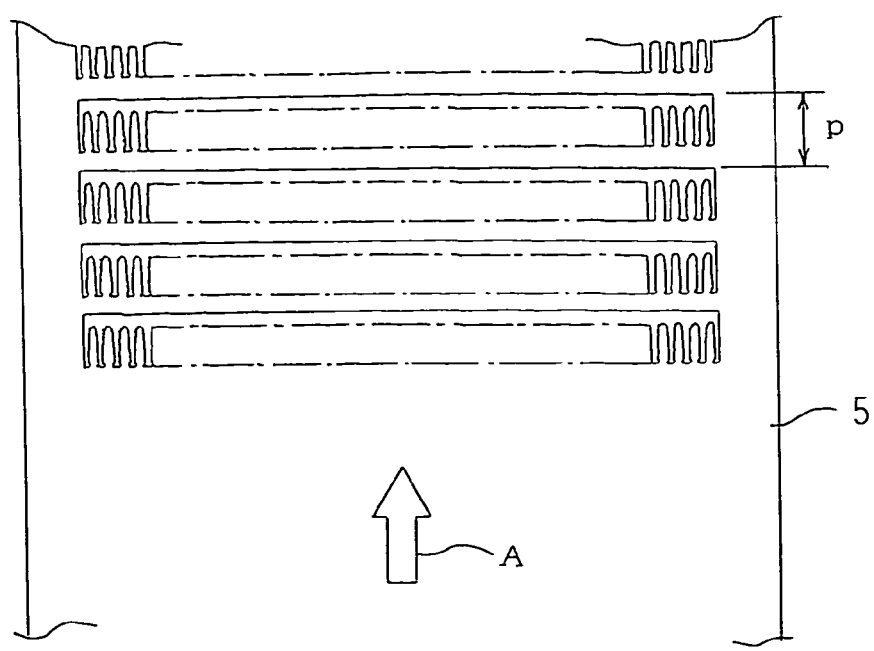
FIG. 2 is a diagram that explains a press-punching process in a method for manufacturing a stator core according to Embodiment 1 of the present invention.
Figure 3:
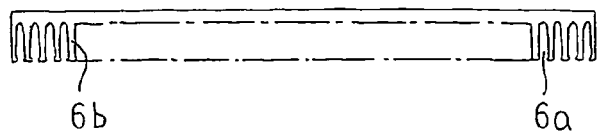
FIG. 3 is a top plan of a core segment that was punched from a rolled steel plate.
Figure 4A:
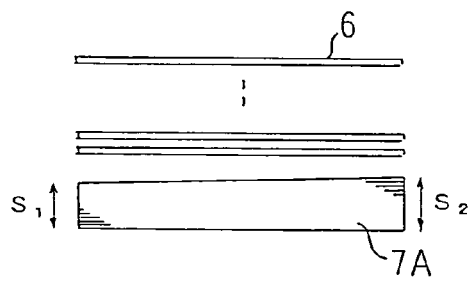
FIGS. 4A through 4D are diagrams that explain a process for preparing a core assembly in the method for manufacturing a stator core according to Embodiment 1 of the present invention.
Figure 4B:
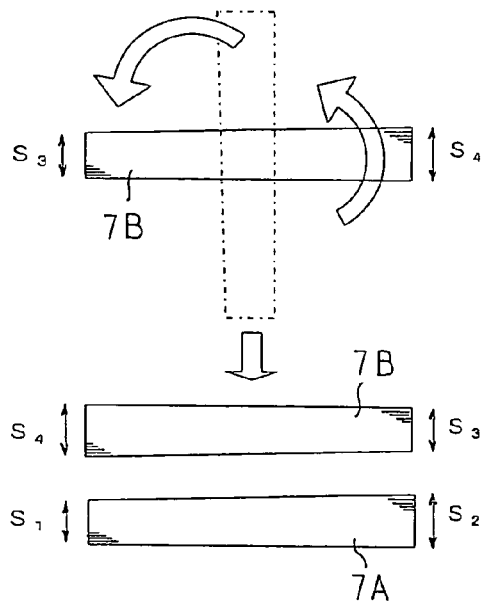
Figure 4C:
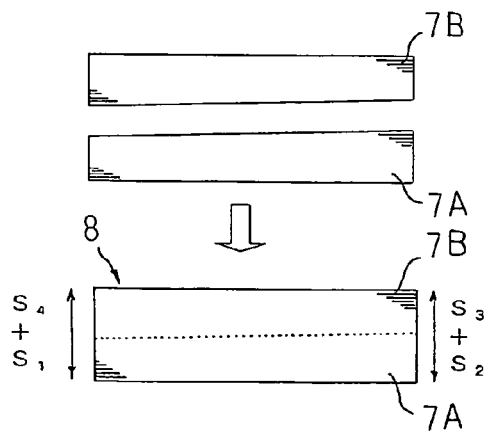
Figure 4D:
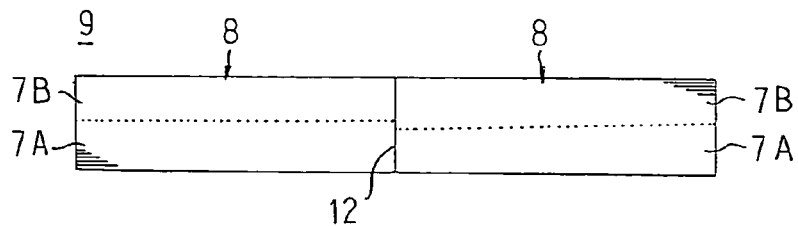
Figure 5:
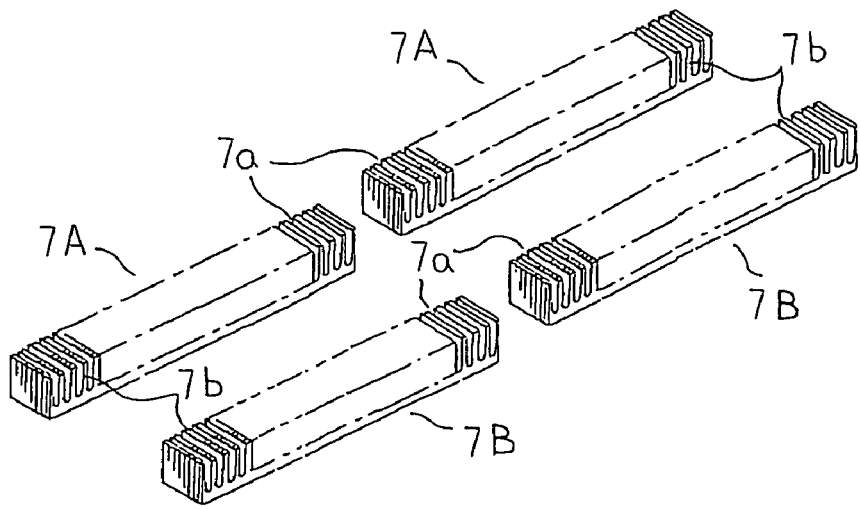
FIG. 5 is an exploded perspective of a core assembly that was prepared using the method for manufacturing a stator core according to Embodiment 1 of the present invention.
Figure 6:
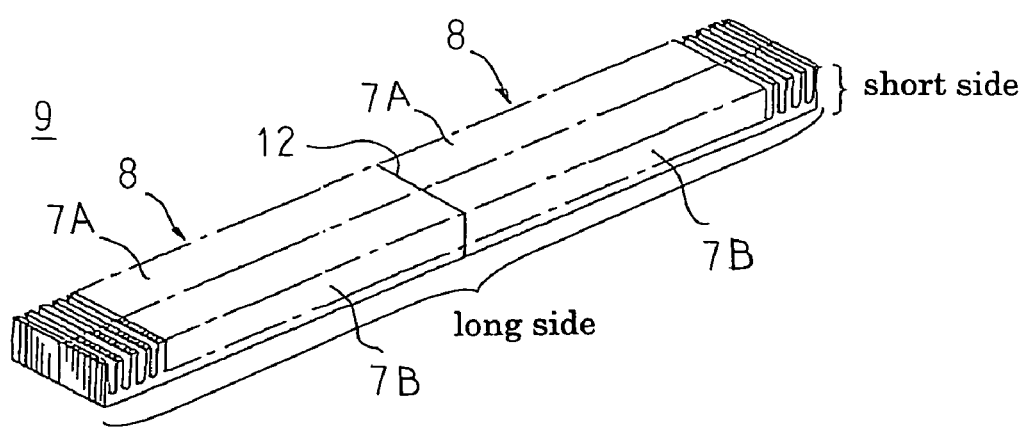
FIG. 6 is a perspective of the core assembly that was prepared using the method for manufacturing a stator core according to Embodiment 1 of the present invention.
Figure 7A:
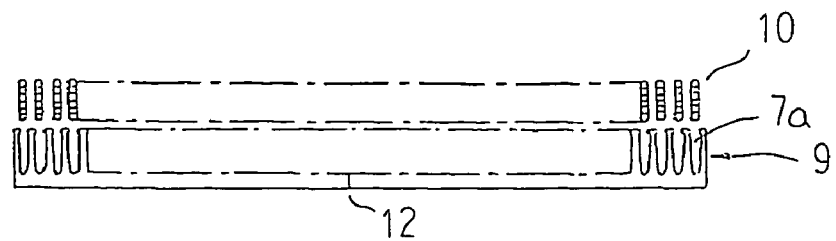
FIGS. 7A through 7C are diagrams that explain a process for bending the core assembly in the method for manufacturing a stator core according to Embodiment 1 of the present invention.
Figure 7B:
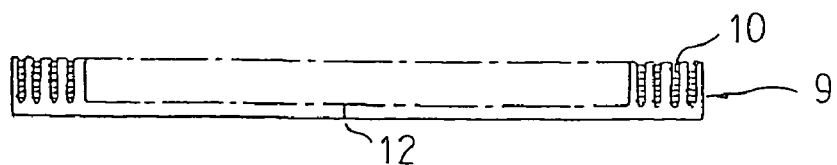
Figure 7C:
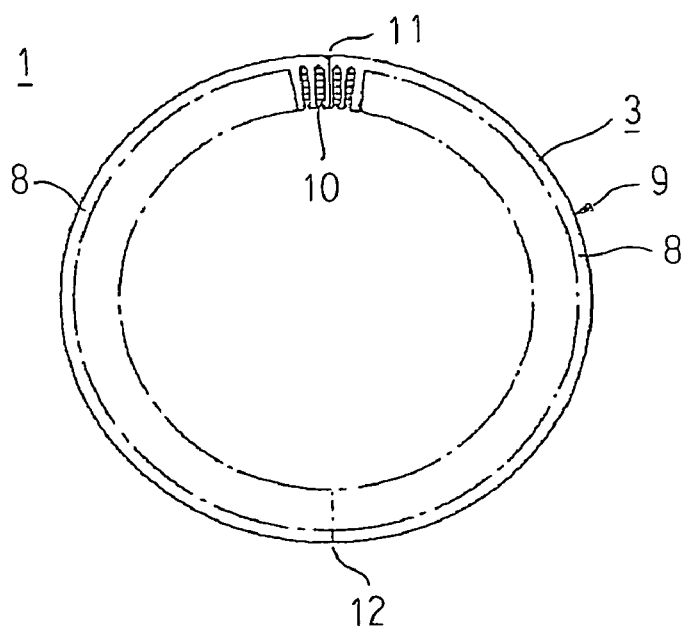

FIG. 1 is a perspective of a dynamoelectric stator that was prepared using a stator core according to Embodiment 1 of the present invention, FIG. 2 is a diagram that explains a press-punching process in a method for manufacturing a stator core according to Embodiment 1 of the present invention, FIG. 3 is a top plan of a magnetic steel plate that was punched from a rolled steel plate, FIGS. 4A through 4D are diagrams that explain a process for preparing a laminated core in the method for manufacturing a stator core according to Embodiment 1 of the present invention, FIG. 5 is an exploded perspective of a laminated core that was prepared using the method for manufacturing a stator core according to Embodiment 1 of the present invention, FIG. 6 is a perspective of the laminated core that was prepared using the method for manufacturing a stator core according to Embodiment 1 of the present invention, and FIGS. 7A through 7C are diagrams that explain a process for bending the laminated core in the method for manufacturing a stator core according to Embodiment 1 of the present invention.

In FIG. 1, a stator 1 is constituted by: a stator winding 2; and a cylindrical stator core 3 that is prepared by laminating a predetermined number of magnetic steel plates. Slots 3a that open radially inward are arranged at a uniform angular pitch, for example, circumferentially on the stator core 3 and the stator winding 2 is mounted by being installed in the slots 3a. An insulator (not shown) is also mounted inside each of the slots 3a so as to ensure electrical insulation between the stator winding 2 and the stator core 3. Here, the stator core 3 is divided into two equal sections circumferentially and divided into two equal sections axially so as to be constituted by four (first through fourth) core sections 4a through 4d.

Moreover, in FIG. 1, an abutted linking portion 11 corresponds to a portion where two end surfaces of a core assembly 9 that is described below that has been bent into a cylindrical shape are abutted and joined together, and a core subassembly linking portion 12 corresponds to a portion where end surfaces of core subassemblies 8 that are described below are abutted and joined together. In addition, the core sections 4a through 4d correspond to first laminated core sections 7A and second laminated core sections 7B that are described below when they have been bent into an arc shape.

Next, a method for manufacturing the stator core 3 will be explained with reference to the figures. Here, a rolled steel plate 5 that is constituted by a magnetic steel plate is assumed to have a plate thickness deviation generally seen in narrow-width steel plates. Specifically, the rolled steel plate 5 has a width that is slightly larger than a length of core segments 6 that are described below, and is assumed to have a plate thickness deviation in which the plate thickness becomes gradually thinner progressing from a left edge, through center, to a right edge in a width direction in FIG. 2.

First, the core segment 6 that are punched from the rolled steel plate 5, as shown in FIG. 3, are thin plates that have a flat rectangular shape. Slot portions 6a are formed on the core segments 6 so as to open on a first long side and be arranged at a predetermined pitch longitudinally. Widths of tooth portions 6b at two longitudinal end portions are half the width of other tooth portions 6b. A length of the core segments 6 is half a circumferential length of the stator core 3.

As shown in FIG. 2, the core segments 6 are punched with a long-side direction aligned in a width direction of the rolled steel plate 5 at a pitch p that is slightly longer than a length of a short side of the core segments 6. Moreover, a feed direction A of the rolled steel plate 5 is aligned in a short-side direction of the core segments 6.

Next, as shown in FIG. 4A, punched core segments 6 are laminated with the slot portions 6a and the tooth portions 6b aligned and their punching direction also aligned to a thickness that is half an axial thickness of the stator core 3 and integrated by crimping, etc., to obtain a rectangular parallelepiped first laminated core section 7A. The slot portions 6a line up in the direction of lamination to constitute slots 7a, and the tooth portions 6b are superposed in the direction of lamination to constitute teeth 7b. Thickness of this first laminated core section 7A becomes gradually thinner progressing from a first longitudinal end (thickness: S2) to a second end (thickness: S1) as a result of the plate thickness deviation of the rolled steel plate 5. Moreover, in FIGS. 4A through 4D, the core segments 6 are viewed from an opposite side to the slot portions.

Core segments 6 are similarly laminated with the slot portions 6a and the tooth portions 6b aligned and their punching direction also aligned to a thickness that is half an axial thickness of the stator core 3 and integrated by crimping, etc., to obtain a rectangular parallelepiped second laminated core section 7B. Thickness of this second laminated core section 7B becomes gradually thinner progressing from a first longitudinal end (thickness: S4) to a second end (thickness: S3) as a result of the plate thickness deviation of the rolled steel plate 5.

Thus, as shown in FIG. 5, core segments 6 that have a length that divides the circumferential length of the stator core 3 into two equal sections are laminated to prepare a set of first laminated core sections 7A and second laminated core sections 7B for each section.

Next, as shown in FIG. 4B, the second laminated core sections 7B are rotated 180 degrees around an axis of the second laminated core section 7B that is parallel to the short-side direction and passes through a midpoint in the long-side direction and the direction of lamination, and are laminated onto the first laminated core sections 7A. Here, the second laminated core sections 7B are inverted while maintaining an opening direction of the slots 7a, and the punching direction of the core segments 6 is opposite in direction to the punching direction of the core segments 6 of the first laminated core sections 7A.

The core subassemblies 8 in which the first laminated core sections 7A and the second laminated core sections 7B are laminated are configured into rectangular parallelepipeds that have a length that is half the circumferential length of the stator core 3 and have a thickness equivalent to the axial thickness of the stator core 3. The core subassemblies 8, as shown in FIG. 4C, have a thickness of S1+S4 at a first longitudinal end and a thickness of S2+S3 at a second end. Here, because the core segments 6 are punched in a single row at a pitch p with a long-side direction aligned in a width direction of the rolled steel plate 5, the plate thickness deviations of each of the core segments 6 are equal in the long-side direction, making S1 and S2 equal to S3 and S4, respectively. Thus, the laminated thickness is equal at the first and second longitudinal ends of the core subassemblies 8.

Core subassemblies 8 are prepared for each section. Then, a first end surface of a first core subassembly 8 and a second end surface of a second core subassembly 8 are abutted and joined together as shown in FIG. 4D to achieve the rectangular parallelepiped core assembly 9 that is shown in FIG. 6. This core assembly 9 has a length equal to the circumferential length of the stator core 3 and a thickness equal to the axial thickness of the stator core 3. Moreover, although not shown, the core assembly 9 is integrated by performing laser welding, for example, so as to extend from a first end portion to a second end portion in the direction of lamination on the abutted portions of the core subassemblies 8 and on outer wall surfaces on an opposite side from the slot openings at first and second longitudinal ends of the core subassemblies 8. In addition, laser welding may also be performed in a plurality of strips so as to extend from the first end portion to the second end portion in the direction of lamination on other portions of the outer wall surface of the core assembly 9 on the opposite side from the slot openings.

Next, as shown in FIGS. 7A and 7B, a winding assembly 10 constituting the stator winding 2 is mounted to the core assembly 9. Thereafter, as shown in FIG. 7C, the core assembly 9 with the winding assembly 10 mounted is bent into a cylindrical shape, and first and second end surfaces of the core assembly 9 are abutted and joined integrally to obtain the stator core 3. Then, the winding assembly 10 is connected so as to constitute the stator winding 2 and obtain the stator 1.

In Embodiment 1, first and second laminated core sections 7A and 7B are prepared by punching core segments 6 at a predetermined pitch with long-side directions aligned in a width direction of a rolled steel plate 5 and laminating them to a thickness that is half an axial thickness of a stator core 3. Next, core subassemblies 8 are prepared by inverting the second laminated core sections 7B and laminating them onto the first laminated core sections 7A.

Thus, even if there are plate thickness deviations in a width direction of the rolled steel plate 5, the plate thickness deviations are canceled out by inverting the second laminated core sections 7B and laminating them onto the first laminated core sections 7A, enabling thickness in the direction of lamination at two ends of the core subassemblies 8 to be made equal. Thus, a stator core 3 can be achieved in which the occurrence of the differences in level in the direction of lamination at an abutted linking portion 11 and a core subassembly linking portion 12 are suppressed. In addition, deterioration of welding reliability at the abutted linking portion 11 and the core subassembly linking portion 12 is suppressed.

Because the core segments 6 are punched at a predetermined pitch with long-side directions aligned in a width direction of a rolled steel plate 5, efficient materials yield is made possible and cost reductions are enabled. Because the core segments 6 are punched to a length that is half the circumferential length of the stator core 3, workspace for inverting the second laminated core sections 7B can be saved, enabling reductions in man-hours and costs. In addition, because the core segments 6 have a length that divides the circumferential length of the stator core 3 into equal sections, there is only one type of core segment 6, the number of dies is not increased, and incorrect assembly by mixing up core subassemblies 8 is also prevented.

Consequently, using the manufacturing method according to Embodiment 1, manufacturing facility costs, die costs, and manufacturing costs can be reliably reduced. In addition, maintenance is also facilitated by reducing the die in size, enabling maintenance costs to be reduced, and also facilitating quality control of stator cores made therewith.

A stator core 3 that is produced in this manner is configured by joining four core sections 4a through 4d that are made by dividing the stator core 3 into two equal sections circumferentially and dividing it into two equal sections axially. Each of the core sections 4a through 4d are configured by laminating core segments 6 to a thickness that is half an axial thickness of a stator core 3 with their punching direction aligned. The first and second core sections 4a and 4b are laminated with the punching direction of their core segments 6 in opposite directions, and the third and fourth core sections 4c and 4d are laminated with the punching direction of their core segments 6 in opposite directions. Thus, the occurrence of differences in level at the abutted portions between the lamination of the first and second core sections 4a and 4b and the lamination of the third and fourth core sections 4c and 4d that result from plate thickness deviations in the rolled steel plate is suppressed.

Consequently, if this stator core 3 is used in dynamoelectric machines, disturbances in the magnetic flux passing between the stator core 3 and the rotor core do not arise, achieving superior magnetic circuit characteristics, and the occurrence of magnetic noise that results from the number of magnetic poles is also suppressed, achieving superior quality.

Embodiment 2

In Embodiment 1 above, a rolled steel plate 5 that has a plate thickness deviation that is generally seen in narrow-width steel plates was explained as being used, but in Embodiment 2, a rolled steel plate 5A that has a plate thickness deviation that is generally seen in broad-width steel plates is used. This rolled steel plate 5A has a width that is slightly larger than twice a length of core segments 6, and is assumed to have a plate thickness deviation in which the plate thickness is thick at a central portion and thin at two edges in a width direction in FIG. 8.

Figure 8:
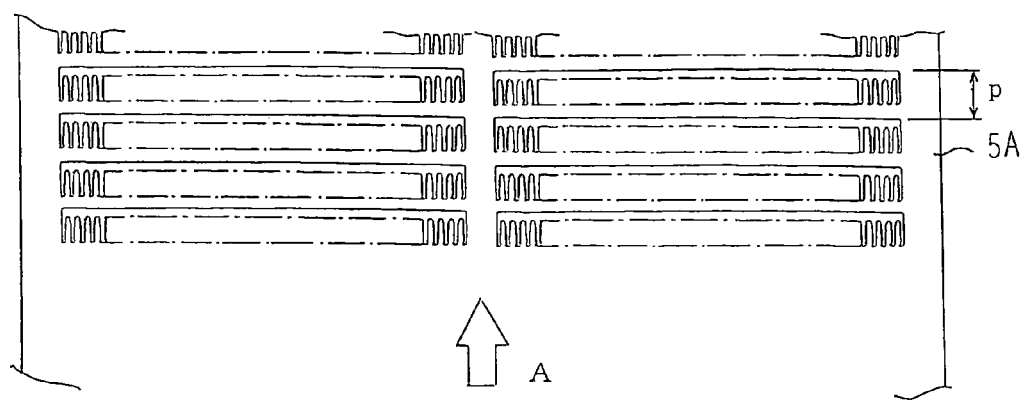
FIG. 8 is a diagram that explains a press-punching process in a method for manufacturing a stator core according to Embodiment 2 of the present invention.

In Embodiment 2, as shown in FIG. 8, the core segments 6 are punched in two (first and second) columns with a long-side direction aligned in a width direction of the rolled steel plate 5A at a pitch p that is slightly longer than a length of a short side of the core segments 6.

A stator core 3 is prepared in a similar manner to Embodiment 1 above using core segments 6 that have been punched in the first column. In other words, core segments 6 that have been punched in the first column have a plate thickness deviation similar to that of Embodiment 1 above, and the plate thickness deviations of each of the core segments 6 are equal in the long-side direction. Thus, the plate thickness deviations are canceled out by inverting second laminated core sections 7B that are prepared by laminating the core segments 6 and laminating them onto first laminated core sections 7A, enabling thickness in the direction of lamination at two ends of core subassemblies 8 to be made equal.

Moreover, a stator core 3 is similarly prepared using core segments 6 that have been punched in the second column.

Consequently, similar effects to those in Embodiment 1 above can also be achieved in Embodiment 2.

Embodiment 3

Figure 9:
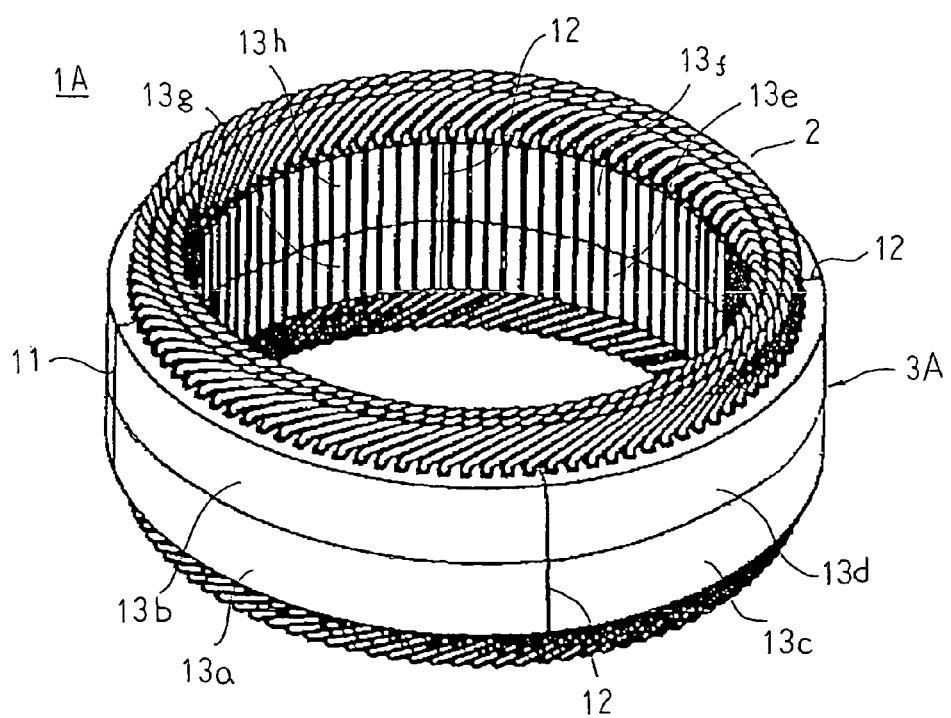
FIG. 9 is a perspective of a dynamoelectric stator that was prepared using a stator core according to Embodiment 3 of the present invention.

In Embodiment 1 above, the stator core 3 is constituted by four core sections 4a through 4d that divide its circumferential length into two equal sections and divide its axial thickness into two equal sections, but in Embodiment 3, as shown in FIG. 9, a stator core 3A is constituted by eight core sections 13a through 13h that divide its circumferential length into four equal sections and divide its axial thickness into two equal sections.

In FIG. 9, an abutted linking portion 11 corresponds to a portion where two end surfaces of a core assembly 16 that is described below that has been bent into a cylindrical shape are abutted and joined together, and core subassembly linking portions 12 correspond to portions where end surfaces of core subassemblies 15 that are described below are abutted and joined together. In addition, the core sections 13a through 13h correspond to first laminated core sections 14A and second laminated core sections 14B that are described below when they have been bent into an arc shape.

Moreover, Embodiment 3 is constructed in a similar manner to Embodiment 1 above except that core segments have a length that is one quarter of the circumferential length of the stator core 3A.

Figure 10:
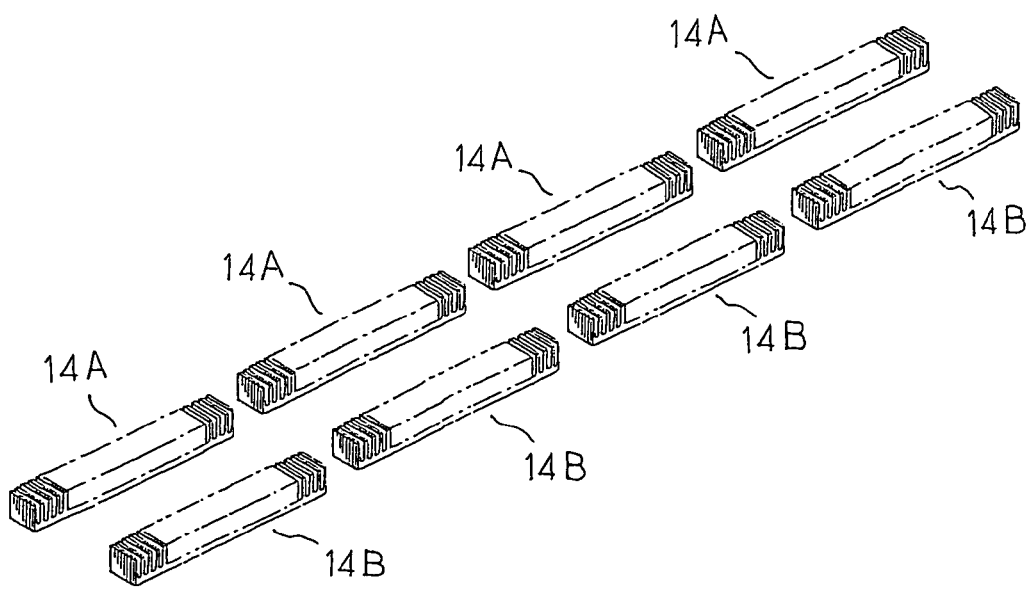
FIG. 10 is an exploded perspective of a core assembly that was prepared using a method for manufacturing a stator core according to Embodiment 3 of the present invention.
Figure 11:
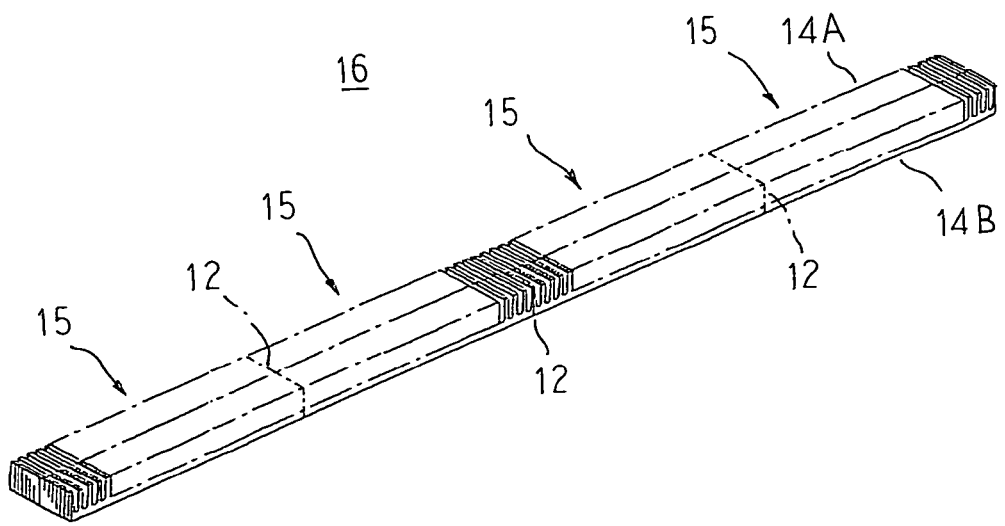
FIG. 11 is a perspective of the core assembly that was prepared using the method for manufacturing a stator core according to Embodiment 3 of the present invention.

In Embodiment 3, core segments have a length that is one quarter of the circumferential length of the stator core 3A, and are punched with longitudinal directions aligned in a width direction of a rolled steel plate. Then, first laminated core sections 14A and second laminated core sections 14B are prepared for each section by laminating the core segments to a thickness that is half an axial thickness of a stator core 3. Four sets of first laminated core sections 14A and second laminated core sections 14B are prepared in this manner, as shown in FIG. 10. Core subassemblies 15 are further prepared in each of the sets by inverting the second laminated core sections 14B while maintaining a slot opening direction and laminating them onto the first laminated core sections 14A. The core assembly 16 that is shown in FIG. 11 is prepared by joining the four core subassemblies 15 that are thus prepared in a single row in a longitudinal direction. Although not shown, the stator core 3A is subsequently prepared by mounting a winding assembly into the core assembly 16, bending it into a cylindrical shape, and abutting and joining together two end surfaces. Next, a stator 1A is prepared by connecting the winding assembly so as to constitute a stator winding 2.

In Embodiment 3, the plate thickness deviations are also canceled out because second laminated core sections that are prepared by laminating core segments are inverted and laminated onto first laminated core sections, enabling thickness in the direction of lamination at two ends of core subassemblies to be made equal. Consequently, similar effects to those in Embodiment 1 above can also be achieved in Embodiment 3.

Moreover, in each of the above embodiments, core subassemblies are prepared by laminating first laminated core sections and second laminated core sections with punching directions of their core segments in opposite directions. However, from the viewpoint of avoiding insulating coating damage in the stator winding, it is desirable for the first laminated core sections and the second laminated core sections to be laminated with the punching directions of the core segments directed toward each other.

In each of the above embodiments, core segments are punched in a single column or two columns with their long-side directions aligned in a width direction of a rolled steel plate, but the number of columns punched is not limited to these, and may also be set appropriately to allow for the length of the long sides of the core segments, the width of the rolled steel plate, and the plate thickness deviations of the rolled steel plate on the condition that the long-side direction of the core segments be aligned in a width direction of the rolled steel plate.

In each of the above embodiments, core segments are explained as having lengths that divide the circumferential length of a stator core (the length of a core assembly) into two equal sections or four equal sections, but the number of sections is not limited to two or four, and it is also not necessary for the division to be into equal sections. If a core assembly has a length of 10, then three kinds of core subassembly that have lengths of 2, 3, and 5, for example, may also be prepared by punching three kinds of core segments that have lengths of 2, 3, and 5. In that case, the three kinds of core segments should have lengths that divide the length of the core assembly into three sections.

In each of the above embodiments, first laminated core sections and second laminated core sections were explained as being prepared by laminating core segments to a thickness that is half a laminated thickness of a core assembly, but the first laminated core sections and the second laminated core sections are not limited to a laminated thickness that is half the laminated thickness of the core assembly, and may also have thicknesses that divide the laminated thickness of the core assembly into 2n equal sections (where n is an integer that is greater than or equal to 1).

In other words, a core assembly may also be configured by integrating (m×n) core subassemblies that have shapes that divide the length of the core assembly into m sections (where m is an integer that is greater than or equal to 2) and also divide the axial thickness into n equal sections (where n is an integer that is greater than or equal to 1).

In that case, a core assembly can be obtained by laminating the n core subassemblies for each of the m sections, for example, arranging a group of m sets of laminated core subassemblies into a single column, and integrating the (m×n) core subassemblies by joining. Alternatively, a core assembly can be obtained by arranging single core subassemblies into a single column for each of the m sections, laminating the m arranged core subassemblies into n layers, and integrating the (m×n) core subassemblies by joining.

What is claimed is:

1. A dynamoelectric stator core that is prepared by bending into a cylindrical shape a rectangular parallelepiped core assembly that is formed by laminating rectangular core segments that have been punched from a rolled steel plate, abutting two end surfaces of said core assembly that has been bent, and joining said abutted portion together, said dynamoelectric stator core comprising:

said stator core is configured by integrating (m×n) core sections that have shapes that divide a circumferential length of said stator core into m sections (where m is an integer that is greater than or equal to 2) and divide an axial thickness into n equal sections (where n is an integer that is greater than or equal to 1); and each of said core sections is configured by laminating a first core section and a second core section that are each formed by aligning punching directions of said core segments and laminating said core segments to a thickness that divides said axial thickness into two equal sections, said first core section and said second core section being laminated such that said punching directions of said core segments are in opposite directions.

* * * * *